US007206316B2

(12) United States Patent
Jabri et al.

(10) Patent No.: US 7,206,316 B2
(45) Date of Patent: Apr. 17, 2007

(54) METHODS AND SYSTEM FOR FAST SESSION ESTABLISHMENT BETWEEN EQUIPMENT USING H.324 AND RELATED TELECOMMUNICATIONS PROTOCOLS

(75) Inventors: Marwan A. Jabri, Broadway (AU); Robert Jongbloed, Rozelle (AU); Albert Wong, Granville (AU)

(73) Assignee: Dilithium Networks Pty Ltd. (AU)

(*) Notice: Subject to any disclaimer, the term of this patent is extended or adjusted under 35 U.S.C. 154(b) by 258 days.

(21) Appl. No.: 10/934,077

(22) Filed: Sep. 3, 2004

(65) Prior Publication Data

US 2006/0029041 A1    Feb. 9, 2006

Related U.S. Application Data

(63) Continuation of application No. 10/732,917, filed on Dec. 9, 2003.

(60) Provisional application No. 60/433,252, filed on Dec. 12, 2002.

(51) Int. Cl.
  *H04L 12/28* (2006.01)
  *H04L 12/56* (2006.01)
(52) U.S. Cl. ...................... 370/410; 370/392
(58) Field of Classification Search ............... None
  See application file for complete search history.

(56) References Cited

U.S. PATENT DOCUMENTS 5,694,457 A * 12/1997 Nixon et al. ........... 379/100.14

(Continued)

FOREIGN PATENT DOCUMENTS

WO    WO 01/37606 A2    5/2001

(Continued)

OTHER PUBLICATIONS

Jabri, The 3G-324M Protocol for Conversational Video Telephony, IEEE Computer Society, 2004, pp. 102-105.

(Continued)

*Primary Examiner*—Chi Pham
*Assistant Examiner*—Ronald Abelson
(74) *Attorney, Agent, or Firm*—Townsend and Townsend and Crew LLP

(57) ABSTRACT

Methods of establishing multimedia telecommunication (a multimedia "call") between equipment ("terminals"). More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). More specifically, it relates to: (i) a method and apparatus for concatenating the H.245 messages that are required to pass between the terminals at the start of the call to establish the capabilities of both terminals and agree on the type and format of media and data to be exchanged; (ii) a method and apparatus for using non-standard H.245 messages or standard H.245 messages with non-standard fields to accelerate such establishment; (iii) a method and apparatus of informing each terminal of the capabilities of the other and proposing the type and format of media and data to be exchanged by means of any user-defined fields that are inserted in the call signaling protocol that is used for bearer establishment prior to the start of the H.324 stage of the call; and (iv) a method and apparatus of informing each terminal of the capabilities of the other and proposing and accepting the type and format of media and data to be exchanged by means of a burst of bits optionally encoded for error control on the bearer channel as soon as it is desired, preferably as the first information transmitted on the bearer channel.

83 Claims, 12 Drawing Sheets

U.S. PATENT DOCUMENTS

| | | | |
|---|---|---|---|
| 6,219,662 B1 * | 4/2001 | Fuh et al. | 707/3 |
| 6,384,853 B1 | 5/2002 | Shaffer et al. | |
| 6,636,745 B2 | 10/2003 | Oprescu-Surcobe et al. | |
| 6,694,471 B1 | 2/2004 | Sharp | |
| 6,754,228 B1 | 6/2004 | Ludwig | |
| 6,810,035 B1 * | 10/2004 | Knuutila et al. | 370/354 |
| 6,909,708 B1 * | 6/2005 | Krishnaswamy et al. | 370/352 |
| 6,922,731 B1 * | 7/2005 | Morioka et al. | 709/231 |
| 7,031,279 B2 * | 4/2006 | Lee et al. | 370/331 |
| 2002/0114272 A1 | 8/2002 | Stewart | |
| 2003/0202487 A1 | 10/2003 | Harris et al. | |
| 2004/0028037 A1 | 2/2004 | Rasanen et al. | |
| 2004/0076145 A1 | 4/2004 | Kauhanen et al. | |
| 2004/0158647 A1 | 8/2004 | Omura | |

FOREIGN PATENT DOCUMENTS

| | | |
|---|---|---|
| WO | WO 01/76288 A1 | 10/2001 |
| WO | WO 02/052825 A | 7/2002 |
| WO | WO 02/071721 A1 | 9/2002 |
| WO | WO 2004/054221 A1 | 6/2004 |
| WO | WO 05/055556 A1 | 6/2005 |
| WO | WO 2006-020031 A3 | 2/2006 |
| WO | WO 2008-020031 A2 | 2/2006 |

OTHER PUBLICATIONS

Lee et al., An Implementation of Control Protocol for Multipoint Audio-Video Teleconferencing Systems, Distributed Multimedia Section, ETRI, Taejon, Korea, 4 pages.

Lindbergh, The H.234 Multimedia Communication Standard, Picture Tel Corporation, IEEE Communications Magazine, Dec. 1996, pp. 46-51.

Wen et al., Implement of System Control Part In a Multimedia Communication Terminal, State Key Laboratory on Microwave & Digital Communcations, pp. 1372-1375.

ITU Study Group 16, Series H: Audiovisual and Multimedia Systems: Infrastructure of Audiovisual services—Systems and terminal equipment for audiovisual services, H.460.6 Extended Fast Connect Feature, Oct. 2002, pp. 1-17, Retrieved from the Internet <<http://ftp3.itu.int/av-arch/avc-site/2001-2004/0210_Gen/h460-6plan.zip>> on Dec. 9, 2005.

ITU Study Group 16, Series H: Audiovisual and Multimedia Systems: Infrastructure of Audiovisual services—Systems and terminal equipment for audiovisual services, H.324 Terminal for low bit-rate multimedia communication, Feb. 1998, pp. 1-50.

ITU-T Recommendation H.245, Series H: Audiovisual and Multimedia Systems: Infrastructure of Audiovisual Services Procedures, Control for Multimedia Communication, International Telecommunication Union, Sep. 1998, pp. 1-273.

* cited by examiner

* Note that if the mediaWaitForConnect is set to TRUE in the Setup message then the media is not transmitted until after the Connect message is sent.

```
Type2Request ::= SEQUENCE version INTEGER (1..255),
    license INTEGER (1..MAX),
    terminalType    INTEGER (0..255),  -- For MSD
    multiplexEntryDescriptors    SET SIZE (1..15) OF
                    MultiplexEntryDescriptor OPTIONAL, -- MTE
```

Figure 6

```
Type2Response ::= SEQUENCE sequenceNumber  SequenceNumber, version INTEGER (1..255),
    license INTEGER (1..MAX), decision    CHOICE   -- MSD result based on "terminalType" compare
                         -- if terminalType is the same then caller
        master  NULL,    -- is always the master
        slave   NULL multiplexTableEntryNumber SET SIZE (1..15) OF
                                    MultiplexTableEntryNumber OPTIONAL, logicalChannels SEQUENCE OF OpenLogicalChannel,
```

Figure 7

```
Type3Setup ::= SEQUENCE version       INTEGER (1..255),
    license       INTEGER (1..MAX),
    terminalType  INTEGER (0..255),  -- For MSD
    profiles      SEQUENCE (1..30) OF INTEGER (0..65535),
    mediaWaitForConnect BOOLEAN,
```

Figure 8

```
Type3Connect ::= SEQUENCE version INTEGER (1..255),
    license INTEGER (1..MAX),
    decision    CHOICE   -- MSD result based on "terminalType" compare
                         -- if terminalType is the same then caller
        master  NULL,    -- is always the master
        slave   NULL profile INTEGER (0..65535),
```

Figure 9

Profile 0
   Mobile Level 2
   G.723.1 Audio on LCN1
   MUX table 1={LCN1,RC,UCF}
Profile 1
   Mobile Level 2
   GSM-AMR Audio on LCN1
   MUX table 1={LCN1,RC,UCF}, 2={LCN2,RC,UCF}
Profile 2
   Mobile Level 2
   G.723.1 Audio on LCN1
   H.263 QCIF Video on LCN2
   MUX table 1={LCN1,RC,UCF}, 2={LCN2,RC,UCF}
Profile 3
   Mobile Level 2
   GSM-AMR Audio on LCN1
   H.263 QCIF Video on LCN2
   MUX table 1={LCN1,RC,UCF}, 2={LCN2,RC,UCF}
Profile 4
   Mobile Level 2
   GSM-AMR Audio on LCN1
   MPEG4 QCIF Video on LCN2
   MUX table 1={LCN1,RC,UCF}, 2={LCN2,RC,UCF}

Figure 10

METHODS AND SYSTEM FOR FAST SESSION ESTABLISHMENT BETWEEN EQUIPMENT USING H.324 AND RELATED TELECOMMUNICATIONS PROTOCOLS

CROSS-REFERENCES TO RELATED APPLICATIONS

This application is a continuation in part of U.S. application Ser. No. 10/732,917, filed Dec. 9, 2003, which claims priority to U.S. Provisional No. 60/433,252 filed Dec. 12, 2002, which is incorporated by reference herein.

COPYRIGHT NOTICE

A portion of this application contains computer codes, which are owned by Dilithium Networks Pty Ltd. All rights have been preserved under the copyright protection, Dilithium Networks Pty Ltd. ©2003.

BACKGROUND OF THE INVENTION

The present invention relates generally to methods of establishing multimedia telecommunication (a multimedia "call") between equipment ("terminals"). More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). Merely by way of example, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a Multimedia Gateway to mediate between the protocols used at each endpoint, but it would be recognized that the invention may also include other applications.

H.324 is an International Telecommunication Union (ITU) protocol standard for multimedia communication over general switched networks (GSTN). H.324M is an extension of H.324 for operations over mobile networks, and 3G-324M is a recommendation by the third generation partnership program (3GPP) defining adaptation of H.324M for use within 3GPP and also adopted by 3GPP2. We call H.324-like equipment devices and systems employing protocol based or derived from H.324. H.324-like equipment can connect to other H.324-like equipment via switching centers and to other non-H.324-like equipment through multimedia gateways. An example of a non-H.324-like equipment is an H.323 equipment. H.323 is an International Telecommunication Union protocol Standard for multimedia communication over non-guaranteed bandwidth packet networks. An H.323-like equipment is an equipment that employs a protocol based or derived from the H.323 protocol.

Without any loss of generality, we will use the term "H.324" to indicate H.324-like equipment including H.324M and 3G-324M equipment and "H.323" to indicate H.323-like equipment.

Also without any loss of generality we use the term "equipment" to indicate either a user end equipment such as a handset, or network end equipment such as a switch or gateway. The term "equipment" covers the meaning of "entity". We also use the terms "equipment" and "terminal" interchangeably, and they both indicate the same meaning in the present document.

If a call is made between equipments which are an embodiment of the H.324, H.324M or 3G-324M, the first stage of the call is to establish an end-to-end bearer between the equipments. This stage is called Call Signaling and is outside the scope of H.324, except where modems and the General Switched Telephony Network are used. The second stage of the call is to establish the H.324 session, to provide a means of transporting video, audio and data between the equipments in a format that is known to, and supported by the equipments. In order to do this H.324M makes use of two further ITU-T Recommendations.

The first of these Recommendations used is H.223 "Multiplexing protocol for low bit rate multimedia communication". H.223 specifies a frame-oriented multiplexing protocol which allows the transfer of any combination of digital voice, video and data (e.g. command and control) information over a single communication link. The H.223 may have a number of modes of operation, specified in Annexes A, B and C of the H.223 Recommendation that are intended to provide increased resilience in the presence of errors. These are also known as Mobile Levels 1, 2 and 3. H.223 without the application of any of these Annexes is also sometimes referred to as operating at Mobile Level 0 (base-line). H.324 has the concept of Logical Channels which is a way of providing virtual channels over the circuit switched link. The role of the multiplexer is to combine (multiplex) parts of the data chunks written on the logical channels into frames known as a Multiplexer Protocol Data Unit (MUX-PDU). Logical Channel 0 is always available and is used for Command and Control. Data (voice, video, command and control and other general data) is passed to/from the H.223 multiplexer through bitstream chunks called service data units (SDUs). Before being multiplexed, these different SDUs go through Adaptation Layers where extra information may be added for purposes such as error detection, sequence numbering and retransmission requests.

The second of these Recommendations is H.245 "Control protocol for multimedia communication" which specifies the syntax and semantics of terminal information messages as well as procedures to use them for in-band negotiation at the start of or during communication. The messages cover receiving and transmitting capabilities and preferences, logical channel signaling and control and indication. The messages that are specified in H.245 are expressed in the ITU-T Abstract Syntax Notation (ASN.1) and can be classified as of Request, Response, Command or Indication type. H.245 messages are encoded according to the ASN.1 standard before being transmitted. When a terminal sends an H.245 message of type Request it requires that an appropriate message of type Response is sent by the remote terminal. If the Response (sometimes referred to as an Ack for Acknowledgement) is not received within a certain time, the sending terminal will re-transmit the Request or take another appropriate action if no response has been received for repeated Requests. Re-transmission of requests may occur a number of times. Many of the H.245 messages associated with call setup are of the Request type.

H.245 also requires a reliable link layer for proper operation. The principal means of providing this, specified in Annex A of H.324, is to use the Simple Retransmission Protocol (SRP) or the Numbered Simple Retransmission Protocol (NSRP), in which one or more H.245 messages, known collectively as a MultimediaSystemControl PDU and in the present document as an H.245 PDU, are formed into SRP Command Frames prior to sending, and the receiving terminal must send an SRP Response Frame (Sometimes referred to as an SRP Ack) to acknowledge correct receipt of an SRP Command Frame. No further H.245 messages may be sent by a terminal until the SRP Ack for the last message has been received.

The combined effect of the requirement to send an H.245 Response message for each H.245 Request Message received, and of the need to receive an SRP Ack for every SRP Command Frame sent means that a single H.245 Request message may take some time to be conveyed successfully. The communication involved in sending an H.245 Request message from one terminal (A) to another (B), and getting an H.245 Response (Ack) message back is shown in FIG. 1A, which also shows the SRP Command Frames (SRP CF) and SRP Response Frames (SRP RF or SRP Ack) involved when single H.245 messages are formed into single SRP Command Frames. The H.324 standard allows for multiple H.245 messages to be concatenated into a single SRP Command Frame; however this capability is often not implemented, in which case such terminals may respond only to the first H.245 message encountered in an SRP Command Frame. In some cases, terminals which do not support this capability may malfunction upon receipt of an SDU containing multiple H.245 requests or responses.

We will refer to the sequence of H.245 Request and Response shown in FIG. 1A as a "round trip" and the time associated with completing it as a "round trip delay".

The key steps involved in setting up and connecting a typical H.324 call are as follows:

1. Call signaling (bearer establishment)—outside the scope of H.324. Normally a modem connection if GSTN, through ISDN, or signaling through mobile switching centers in the mobile case.
2. Mobile level detection (MLD)—Where a common Mobile Level is agreed on between equipments. This step is performed by H.324 equipment that supports mobile extensions such as H.324M and 3G-324M equipment.
3. Terminal Capability Exchange (TCS)—H.245 Messaging
4. Master Slave determination (MSD)—H.245 Messaging
5. Open/Close Logical Channels (OLC)—H.245 Messaging
6. Multiplexer Table Entries Exchange (MTE)—H.245 Messaging Steps (3) to (6) are performed using a sequence of H.245 Request and Response messages as described above and illustrated in FIG. 1A. The full sequence of Request and Response messages involved in an H.324 call is shown in FIG. 1B. Note the order of steps (5) and (6) above can be interchanged. It should be noted that Steps (3) to (6) relate to procedures that are defined by underlying state machines that are also known as Signaling Entities. The relevant signaling entities are:

1. Capability Exchange Signaling Entity (CESE)
2. Master Slave Determination Signaling Entity (MSDSE)
3. Logical Channel Signaling Entity (LCSE)
4. Multiplex Table Signaling Entity (MTSE)

Once these steps have completed, media (video, audio and data) can flow between the terminals. Note the H.245 messages flow on the Logical Channel 0 which as previously described is predefined and carried by the means of the multiplexer predefined Multiplex Table Entry 0. Once other Multiplex Table Entries have been exchanged these can also be used in conjunction with H.245 messages.

The key steps above are often handled sequentially; however this results in as many as ten H.245 message round trip delays in order to establish an H.324 session with two logical channels in each direction. In addition, the SRP scheme (or Numbered version —NSRP, in cases where the mobile level is greater than zero) used for H.324/H.245, which requires an SRP message to be received by the endpoint for every message sent, prior to sending any other message, regardless of whether it is associated with the same Signaling Entity or not, further limits the scope to pipeline messages on the network, making call setup slower than if this were not the case. SRP messages are not shown in FIG. 1B.

For H.324M, the Terminal Capabilities Set request (TCS) step described above and shown in FIG. 1B is preceded by a mobile level detection/multiplexer synchronization phase. This consists of each terminal transmitting a repeating pattern of bits (flags) that indicate the highest Mobile Level that it operates at. Each terminal examines the flags that it is receiving. If these flags represent a lower Mobile Level then the terminal drops down to the same lower level. When both terminals are transmitting the same flag sequence this step completes.

Arising from the set of procedures described above that are required to take place to establish an H.324M call, when a call is made from a terminal which is an embodiment of the H.324 it is prone to suffer from long call setup time, which is the interval between the time that the call signaling is initiated to the time that the exchange of voice and video commences between an H324-like end-point (H.324, H.324M or 3G-324M) and other terminals whether H.324-like or not.

The ITU Recommendation H.323 uses H.245 in a similar manner to H.324 for signaling command, control and indication messages related to a call. Unlike H.324, H.323 is equipped with a number of features to speed up the call setup time between H.323 equipment. Similar techniques exist for the IETF Session Initiation Protocol (SIP) protocol.

Thus there exists a need for techniques to speed up the call setup between H.324 like terminals and other terminals either of the H.324 type directly, or terminals such as H.323 via multimedia gateways. The differences between the H.324 protocol (and its extensions such as H.324M and 3G-324M) and H.323 and other protocols mean that additional aspects need to be considered when introducing call establishment speed-up techniques for H.324-like terminals. Such differences include the information about mobile levels where they are used and the messaging and information related to the H.223 multiplexer such as its multiplex table entries, adaptation layers and so on.

BRIEF SUMMARY OF THE INVENTION

According to the present invention, techniques for telecommunications are provided. More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). More specifically, it relates to: (i) a method and apparatus for concatenating the H.245 messages that are required to pass between the terminals at the start of the call to establish the capabilities of both terminals and agree on the type and format of media and data to be exchanged; (ii) a method and apparatus for using non-standard H.245 messages, or standard H.245 messages with non-standard fields to accelerate such establishment; (iii) a method and apparatus for informing each terminal of the capabilities of the other and proposing the type and format of media and data to be exchanged by means of any user-defined fields that are available in the call signaling protocol that is used for bearer establishment prior to the start of the H.324 stage of the call; and (iv) a method and apparatus of informing each terminal of the capabilities of the other and proposing the type and format of media and data to be exchanged by means of a burst of bits optionally encoded for error control on the bearer channel as soon as it is desired, preferably as the first information transmitted on the bearer channel.

These methods may be used separately or severally to reduce the time that is taken from the point when a user requests the establishment of a call to the point where media starts to be exchanged between the terminals. Merely by way of example, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a Multimedia Gateway to mediate between the protocols used at each endpoint, but it would be recognized that the invention may also include other applications.

According to the present invention, techniques for reducing the number of sequential steps that are required to establish an H.324-like call are provided through a number of methods that may be used separately or severally.

At least four types of methods are described to reduce the number of steps. We call these methods Type I, II, III, and IV and we number them for ease of reference in the present document. Such methods may be combined or used with conventional techniques depending upon the embodiment. One of ordinary skill in the art would recognize many variations, alternatives, and modifications.

In a specific embodiment, the methods are as follows:

1. Type I: Concatenation of H.245 messages so the number of standard SRP/NSRP command messages is reduced, in order to start media communication.
2. Type II: Incorporation of H.245 Non-Standard messaging capabilities to incorporate information about the equipment involved in the call so the number of H.245 and SRP/NSRP message exchanges are minimized, in order to start media communication.
3. Type III: Incorporation of equipment preferences information in the call signaling protocol exchange as to eliminate the need for further information exchange between the equipment in order to start media communication following call signaling.
4. Type IV: Incorporation of equipment preferences information in the first burst of bits transmitted by the equipment on the bearer as soon as the bearer is available for data transmission. The burst of bits could represent the preferences information, an encrypted version of it, or an encoded version of it where the encoding is meant for protection against errors due to interference or other conditions. The burst of bits may be repeated a number of times to increase the likelihood of another entity supporting Type IV to detect the information, and to avoid issues with synchronisation of the start of bearer data transmission/transport.

In each case the method provides a means to revert to the behavior of a terminal conforming with the H.324 standard.

Type I: Speed-Up by Concatenation of H.245 Messages in SRP/NSRP Command Frames

This method exploits the capability to concatenate multiple H.245 messages within a single SRP/NSRP (H.245 PDU) Command Frame as a mean to reduce the number of H.245, SRP/NSRP messages and associated round-trip delays. The H.245 messages have to be concatenated in a way as not to violate dependencies.

The usage of H.245 within H.324 allows equipment to concatenate multiple H.245 elements into a single PDU, thus avoiding the need to use two round trips for each request/response pair due to the need for an SRP/NSRP response to be received for each H.245 PDU before the next PDU is allowed be transmitted.

The method uses concatenated H.245 to send multiple H.245 messages, each originating from different Signaling Entities that have no dependencies on each other, within a single H.245 PDU.

Interoperability with equipment that do not support concatenated H.245 is achieved by noting that such equipment ignore the second and subsequent H.245 elements in a PDU, so will not send any required H.245 Response messages if the ignored message is an H.245 Request message. Therefore the first concatenated H.245 PDU sent should contain at least two Request messages, where the first message must be a Request. If only the Ack for the first message is received, the sending equipment will retransmit those Requests and any other messages that have not been acknowledged, and in doing this and in sending any and all subsequent H.245 messages should revert to sending only a single H.245 message in each subsequent H.245 PDU. If responses to all H.245 messages in the first H.245 PDU are received, the sending equipment can continue to use concatenated messages. The use of this technique will reduce the number of round trip delays if concatenated messages are supported. This method does not define any protocol elements additional to those already allowed and defined by the H.245 and H.324 standards. It can be considered to be utilizing the existing protocols in a smart fashion, rather than an extension to it.

Preferably, the present invention provides a method of initiating a call between users with reduced call set-up times using one or more telecommunication networks. The method is provided between at least a pair of H.324-like terminals coupled to the one or more telecommunication networks. The method includes transmitting a call signaling message from a first terminal to a second terminal through a telecommunication network to initiate a call, establishing a bearer channel between the first terminal and the second terminal once the call signaling message has been received by the second terminal, and determining a common mobile level. As used herein and throughout the specification, the term "first terminal" and "second terminal" are provided for illustrative purposes only. Functionality associated with each of these terminal can be interchanged, combined, or the like, without departing from the scope of the claims defined herein. Additionally, the method includes determining two or more H.245 messages associated with set up parameters for an initial predetermined mode of operation, concatenating the two or more H.245 messages into one SRP command frame according to a predetermined size of the SRP command frame, and transmitting the SRP command frame including the two or more H.245 messages from the first terminal to the second terminal through a telecommunication network. Moreover, the method includes transmitting an SRP acknowledge message by the second terminal once the SRP command frame has been received by the second terminal, processing at least the two or more H.245 messages during a predetermined time period, and establishing the initial predetermined mode of operation between the first terminal and the second terminal through the bearer channel.

According to another embodiment, the present invention provides a computer-readable medium including instructions for initiating a call between users with reduced call set-up times using one or more telecommunication networks. The computer-readable medium is provided between at least a pair of H.324-like terminals coupled to the one or more telecommunication networks. The computer-readable medium includes one or more instructions for transmitting a call signaling message from a first terminal to a second terminal through a telecommunication network to initiate a call, one or more instructions for establishing a bearer channel between the first terminal and the second terminal once the call signaling message has been received by the second terminal, and one or more instructions for determining a common mobile level. Additionally, the computer-readable medium includes one or more instructions for determining two or more H.245 messages associated with set up parameters for an initial predetermined mode of operation, one or more instructions for concatenating the two or more H.245 messages into one SRP command frame according to a predetermined size of the SRP command frame, and one or more instructions for transmitting the SRP command frame including the two or more H.245 messages from the first terminal to the second terminal through a telecommunication network. Moreover, the computer-readable medium includes one or more instructions for transmitting an SRP acknowledge message by the second terminal once the SRP command frame has been received by the second terminal, one or more instructions for processing at least the two or more H.245 messages during a predetermined time period, and one or more instructions for establishing the initial predetermined mode of operation between the first terminal and the second terminal through the bearer channel.

Type II: Speed-Up using H.245 Non-Standard Messages/Data Elements

A second method that is the subject of the present invention for reducing the number of sequential steps that are required to establish an H.324-like call proposes the use of Non-Standard messaging capabilities of the H.245 protocol. H.245 allows a number of ways of adding non-standard extensions. There are a number of ways to add non-standard messages, or data elements of existing messages, in H.245 in order to speed up the call. The most interesting of these is the use of a nonstandard Capability within the H.245 TerminalCapabilitySet message and a NonStandardMessage H.245 Response message. These messages can be used to signal that the calling equipment is capable of operating in a particular way, and to provide proposals and preferences to the remote terminal relating to Master Slave Determination, Logical Channel(s) to be opened and Multiplexer Table Entries embedded within these non-standard extensions to accelerate call set-up. If the remote terminal supports this method, it will signal the calling terminal using a non-standard extension which will also indicate that it accepts, and may also propose modifications or provide other information, including for example the Multiplexer Table Entries that it is using.

If the called terminal does not support this method, it will simply ignore the non-standard extension and not respond with the non-standard response, but a standard response. The call will then proceed as for a standard H.324-like call. The Type II method does not require non-supporting terminals to handle Type I method.

Preferably, the invention provides a method of initiating a call between users with reduced call set-up times using one or more telecommunication networks. The method includes transmitting a call signaling message from a first terminal to a second terminal through a telecommunication network to initiate a call and establishing a bearer channel between the first terminal and the second terminal once the call signaling message has been received by the second terminal. The method also includes determining a common mobile level for operation. The method provides one or more custom Non-Standard H.245 messages or custom Non-Standard fields in standard H.245 messages. The one or more custom H.245 messages or custom Non-Standard fields are associated with one or more set up parameters for an initial preferred or predetermined mode of operation. Additionally, the method includes transmitting the one or more custom Non-Standard H.245 messages or custom Non-Standard fields in standard H.245 messages from the first terminal to the second terminal, transmitting a custom Non-Standard response message associated with the one or more custom Non-Standard H.245 messages or custom Non-Standard fields from the second terminal to the first terminal, and processing the one or more custom H.245 messages or custom Non-Standard fields during a predetermined time period. Moreover, the method includes establishing the initial predetermined mode of operation between the first terminal and the second terminal through the bearer channel based upon at least one or more of the custom H.245 messages or custom Non-Standard fields.

According to another embodiment, the present invention provides a computer-readable medium including instructions for initiating a call between users with reduced call set-up times using one or more telecommunication networks. The computer-readable medium is provided between at least a pair of H.324-like terminals coupled to the one or more telecommunication networks. The computer-readable medium includes one or more instructions for transmitting a call signaling message from a first terminal to a second terminal through a telecommunication network to initiate a call, one or more instructions for establishing a bearer channel between the first terminal and the second terminal once the call signaling message has been received by the second terminal, and one or more instructions for determining a common mobile level for operation. Additionally, the computer-readable medium includes one or more instructions for providing one or more custom Non-Standard H.245 messages or custom Non-Standard fields in standard H.245 messages. The one or more custom H.245 messages or custom Non-Standard fields are associated with one or more set up parameters for an initial predetermined mode of operation. Moreover, the computer-readable medium includes one or more instructions for transmitting the one or more custom Non-Standard H.245 messages or custom Non-Standard fields in standard messages from the first terminal to the second terminal, one or more instructions for transmitting a custom Non-Standard response message associated with the one or more custom Non-Standard H.245 messages or custom Non-Standard fields from the second terminal to the first terminal, and one or more instructions for processing the one or more custom H.245 messages or custom Non-Standard fields during a predetermined time period. Also, the computer-readable medium includes one or more instructions for establishing the initial predetermined mode of operation between the first terminal and the second terminal through the bearer channel based upon at least one or more of the custom H.245 messages or custom Non-Standard fields.

Type III: Speed-Up by Incorporation of Equipment Preferences in Call Signaling Phase A third method for reducing call set up times for H.324 terminals proposes passing information during the call signaling phase (bearer establishment) where it is possible to embed user-defined information into the bearer establishment protocol. This method allows an H.324-like calling equipment to specify equipment preferences or predetermined modes in terms of media communication and the underlying configurations for the multiplexer and the logical channels. There are a number of ways to represent such preferences including preference codes (numeric or alphanumeric string representing pre-defined preference configuration) and explicit preferences expressed in a format such as the ITU-T Abstract Syntax Notation (ASN.1) format. We call these preferences (coded or explicit) profiles. In the case of explicit preferences or profile, a list of profiles can be transmitted as part of the bearer setup signal or message. A profile (coded or explicit) specifies exact values for the all aspects of the multiplexer and H.245 channels necessary to set up a call. For example, the Mobile Level, Master Slave Determination request parameters, media formats for each logical channel and the multiplexer table entries for each logical channel must be defined. The answering equipment then selects the profiles to use in user-defined information embedded in the bearer establishment (call signaling) signal or message. This allows the terminals to exchange the parameters of the H.245 channel at the time the called equipment accepts the call, rather than requiring multiple round trips after the call is accepted.

The bearer establishment (call signaling) is typically specific to the network where the H.324-like equipment is being used. In the context of 3G-324M, the call signaling uses an ITU-T Q.931-like call signaling protocol that allows the incorporation of the preference information messages. The Q.931 allows for the incorporation of user-defined information in the protocol messages. Q.931 signaling can be complex, but for the purpose of our description here it can be simplified to two messages. A "Setup" Q.931 message containing the calling party information and other parameter is transmitted from the calling equipment to the called terminal. The called terminal will respond with a "Connect" message to answer the call (e.g. user pressed the answer button). In this context the H.324-like equipment preferences are incorporated in the "Setup" message transmitted by the calling equipment. As mentioned earlier the preference messages can be incorporated in the user defined part of the Q.931 message. When the called terminal answers the call by transmitting the "Connect" Q.931 message, it incorporates its preferred mode of operation in the user defined field of its "Connect" response message. The Setup and Connect messages are described further in the ITU-T Q.931 Recommendation and in the 3GPP technical specification documents. Note that the 3GPP2 equivalent documents exist for the CDMA counterpart of the WCDMA 3GPP.

In the case of ISDN networks (e.g. H.324 over ISDN) and networks signaled using SS7 protocols, a configuration similar to that described above for 3GPP can be used.

In the case of GSTN networks, the call signaling protocols such as V.8, and V.8bis can be augmented to incorporate equipment preference codes.

Ability to utilize coded or explicit preferences overcome some limitations that call signaling protocols may have on the amount of user-defined information that can be included in their messages or signals.

Preferably, the present invention provides a method of initiating a call between users with reduced call set-up times using one or more telecommunication networks. The method includes providing one or more preferences for a call associated with a first terminal (e.g., handset, gateway, and other equipment) and a second terminal (e.g., handset, gateway, and other equipment). The one or more preferences are associated with an initial mode of operation for the call between the first terminal and the second terminal. The method also includes processing the one or more preferences as a Custom Message (e.g., user defined based upon preferences) and embedding the Custom Message in a predetermined field of a call initiation message. The method transfers the Custom Message from the first terminal to the second terminal through a telecommunication network using call signaling and processes the Custom Message by the second terminal. The method includes transferring a Custom Response Message by the second terminal using a call signaling response message to indicate to the first terminal the initial mode of operation and exchanging information between the first terminal and the second terminal after the initial mode of operation has been established.

Note that this method of incorporating equipment preference modes of operation in the call signaling is particularly efficacious when used in conjunction with H.323 fast connect in the context of an H.324/H.323 gateway that mediates calls between H.324-like and H.323-like equipment, respectively. It is similarly efficacious when used in the context of an H.324/SIP gateway that mediates calls between H.324-like and SIP equipment.

According to another embodiment, the present invention provides a computer-readable medium including instructions for initiating a call between users with reduced call set-up times using one or more telecommunication networks. The computer-readable medium is provided between at least a pair of H.324-like terminals coupled to the one or more telecommunication networks. The computer-readable medium includes one or more instructions for providing one or more preferences for a call associated with a first terminal and a second terminal. The one or more preferences are associated with an initial mode of operation for the call between the first terminal and the second terminal. Additionally, the computer-readable medium includes one or more instructions for processing the one or more preferences as a Custom Message, one or more instructions for embedding the Custom Message in a predetermined field of a call initiation message, and one or more instructions for transferring the Custom Message from the first terminal to the second terminal through a telecommunication network using call signaling. Moreover, the computer-readable medium includes one or more instructions for processing the Custom Message by the second terminal, one or more instructions for transferring a Custom Response Message by the second terminal using a call signaling response message to indicate to the first terminal the initial mode of operation, and one or more instructions for exchanging information between the first terminal and the second terminal after the initial mode of operation has been established.

Type IV: Speed-Up by Incorporation of Equipment Preferences in First Data Burst on Bearer Channel Another method for speeding up the call setup is by communicating the Equipment Preferences information described in Type III above on the bearer channel instead of the signalling channel. The Equipment Preferences information can be embedded in an ASN.1 encoded message or using other type of syntax. The message can be further encoded for noise immunity purposes using error control techniques to improve immunity against data corruption due to air-interface of communication channel conditions. The Equipment Preference information can be transmitted on the bearer channel as soon as it is established, and may be repeated a number of times. We call the preferences message transmitted by the caller terminal (entity that originated the call) the Caller AF4 Request and the message transmitted by the answerer terminal the Answerer AF4 Request. The answerer message may contain preferences or may be empty. Once the answerer terminal detects the Caller AF4 Request, it analyses the request and transmits an Answerer AF4 Response which incorporates the accepted preferred mode. As soon as the Caller detects the Answerer AF4 Response it can start transmitting media according to the accepted preference mode. The Caller needs to be able to accept media according to the preferences it indicated in the Caller AF4 Request as it is transmitting the request. The Answerer needs to be able to accept media as it is transmitting its response. The Answerer (called) terminal also transmits an Answerer Request message when the bearer is available. The Answerer Request message could incorporate Equipment Preferences. However for the purpose of speeding up the session setup time, the Caller may ignore the Answerer Request message and simply transmit an empty Response or even not transmit a response. Therefore as both terminals would transmit their request and their response, once the Preferences are detected and decoded correctly to yield the computer program recognizable description, the terminals can automatically switch to the Preferred mode of operation without having to undergo further negotiation. Note that standard operations such as mobile level detection and H.245 procedures can be performed at a later time.

Note that for the purpose of avoiding conflict and speeding up the session setup time, the Answerer entity is the entity taking control of the decision, in that, the Answerer terminal needs to respond to the Caller proposed Equipment Preferences and ignore the response that Caller terminal transmits to the Answerer Request.

Another aspect to be considered is the framing of the AF4 Request and Response messages. In order to facilitate the detection of these messages (whether encoded for noise immunity or not) in the bitstream on the bearer, the messages can be framed using a sequence of one or more byte-codes. The framing sequences would not be involved in the error control coding if used. The longer the framing sequence the better protection of the message is achieved in the presence of noise.

If one of the terminals does not support this mode of session establishment speed-up, or AF4 Response is not received, or there is conflict with the AF4 modes supported by the terminals, then another type of speed-up technique can be tried until a type is recognized or the terminals would proceed with the base-line mode of operation (without speed-up methods).

In a specific embodiment, the present invention provides a system for processing a call between users with reduced call set-up times using one or more telecommunication networks. The system has one or more memories, which may be in a single device or multiple devices. The memory or memories include various computer codes that carry out the functionality described herein. The codes can be in software, hardware, or a combination of these, depending upon the embodiment. Code is directed to providing one or more preferences for a call associated with a first terminal and a second terminal. Preferably, the one or more preferences are associated with an initial mode of operation for the call between a first terminal and a second terminal. Code is directed to processing the one or more preferences as a Custom Message and code is directed to establishing a bearer channel between the first terminal and the second terminal. The system also has code directed to transferring the Custom Message from the first terminal to the second terminal through a telecommunication network using the bearer channel. Depending upon the embodiment, other computer code can exist to carryout the functionality described herein.

The objects, features, and advantages of the present invention, which to the best of our knowledge are novel, are set forth with particularity in the appended claims. The present invention, both as to its organization and manner of operation, together with further objects and advantages, may best be understood by reference to the following description, taken in connection with the accompanying drawings.

BRIEF DESCRIPTION OF THE DRAWINGS

FIG. 6 illustrates an embodiment of the ASN.1 Syntax description for Type II Request;

FIG. 7 illustrates an embodiment of the ASN.1 Syntax description for Type II Response;

FIG. 8 illustrates an embodiment of the ASN.1 Syntax description for Type III Request;

FIG. 9 illustrates an embodiment of the ASN.1 Syntax description for Type III Response;

FIG. 10 illustrates an embodiment of some coded Profiles, and their description, that can be used in Type III Request and Response.

DETAILED DESCRIPTION OF THE INVENTION

According to the present invention, techniques for telecommunications are provided. More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). More specifically, it relates to (i) a method and apparatus for concatenating the H.245 messages that are required to pass between the terminals at the start of the call to establish the capabilities of both terminals and agree on the type and format of media and data to be exchanged (ii) a method and apparatus for using non-standard H.245 messages to accelerate such establishment (iii) a method and apparatus of informing each terminal of the capabilities of the other and proposing the type and format of media and data to be exchanged by means of any user-defined fields that are inserted in the call signaling protocol that is used for bearer establishment prior to the start of the H.324 stage of the call, and (iv) a method and apparatus of informing each terminal of the capabilities of the other and proposing the type and format of media and data to be exchanged by means of messages that are transmitted on the bearer channel prior to the initiation of the H.324 Standard procedures. These methods may be used separately or severally to reduce the time that is taken from the point when a user requests the establishment of a call to the point where media starts to be exchanged between the terminals. Merely by way of example, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a Multimedia Gateway to mediate between the protocols used at each endpoint, but it would be recognized that the invention may also include other applications.

The methods described above are generic and can be implemented in many different ways by a person skilled with the field. We describe below example embodiments to illustrate the methods which can be adapted easily to suite specific equipment needs.

TYPE I EXAMPLE EMBODIMENT

Figure 1A:
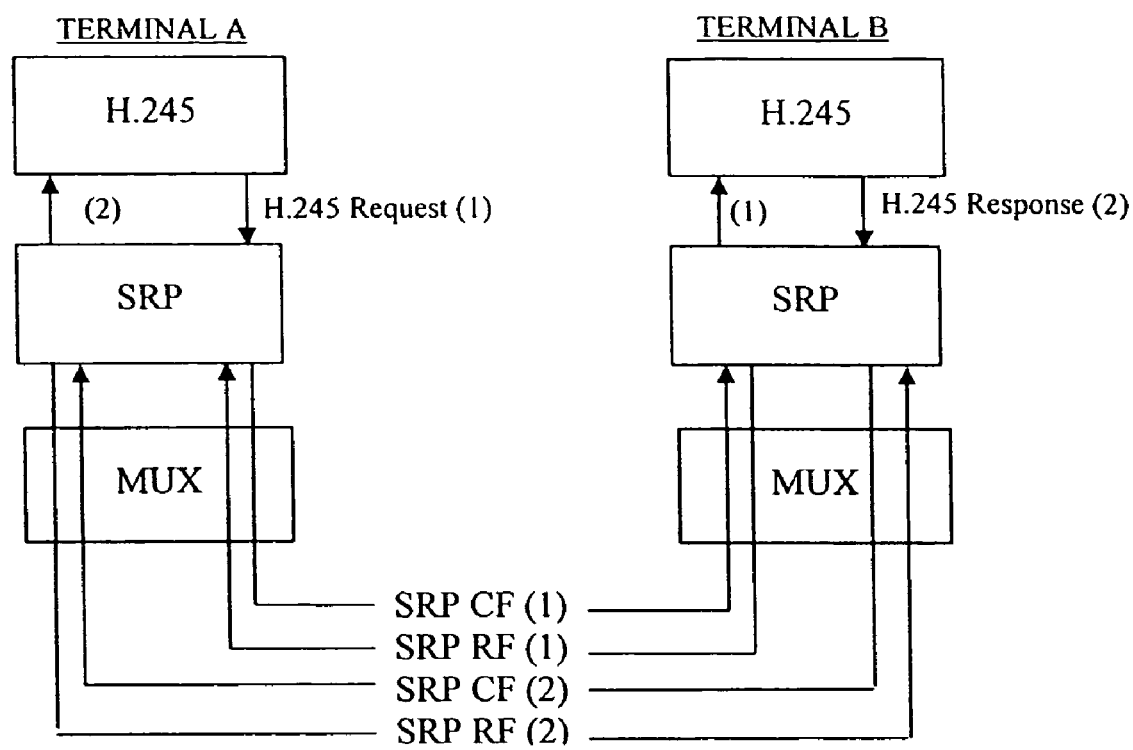
FIG. 1A is a diagram useful in illustrating the communications that flow between two H.324 terminals when an H.245 Request message is sent from one terminal to the other.
Figure 1B:
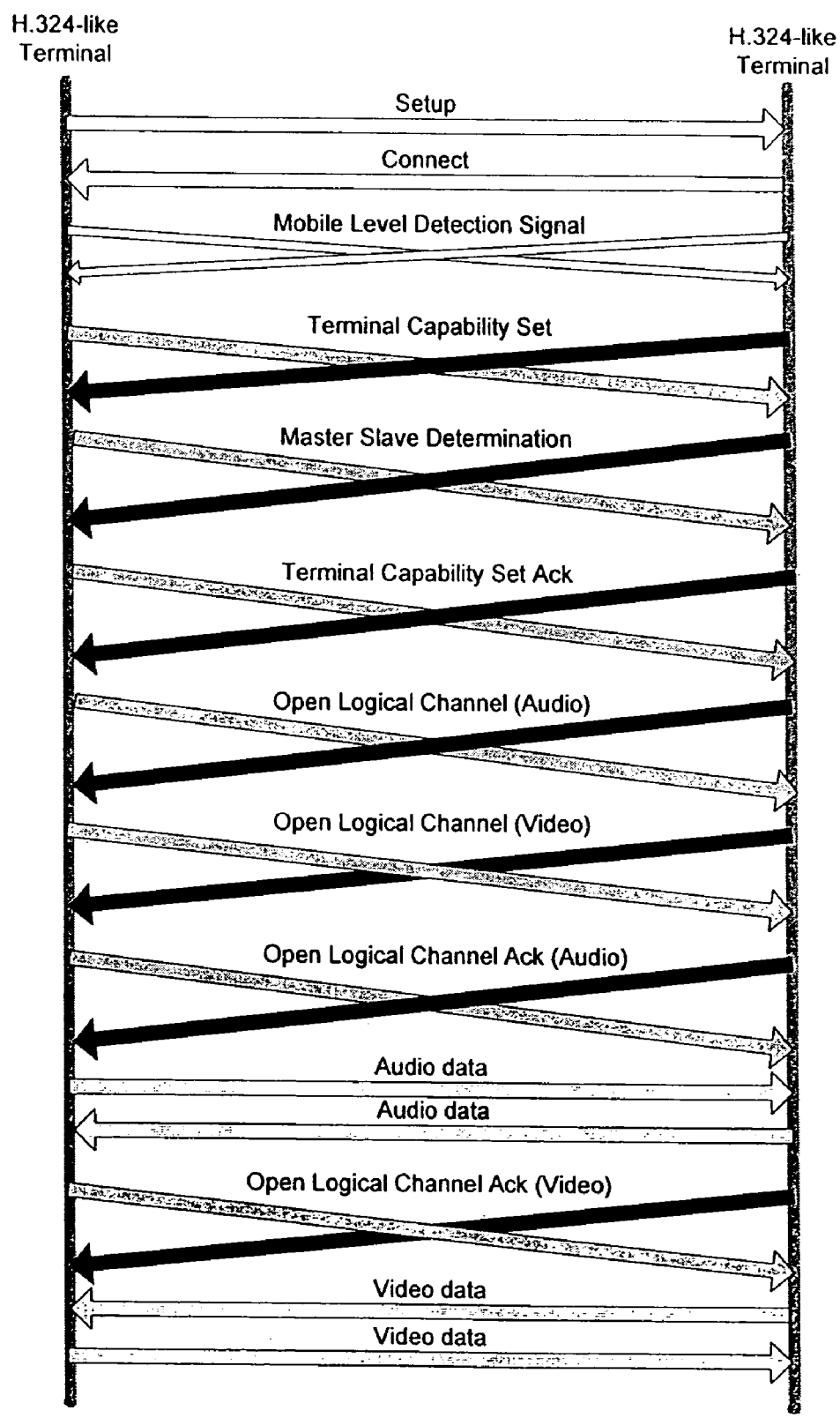
FIG. 1B illustrates session Set-up for a call between H.324-like equipment. Note in this case unidirectional video channels are used (e.g. video over adaptation layer AL2 of the H.223 multiplexer).
Figure 2:
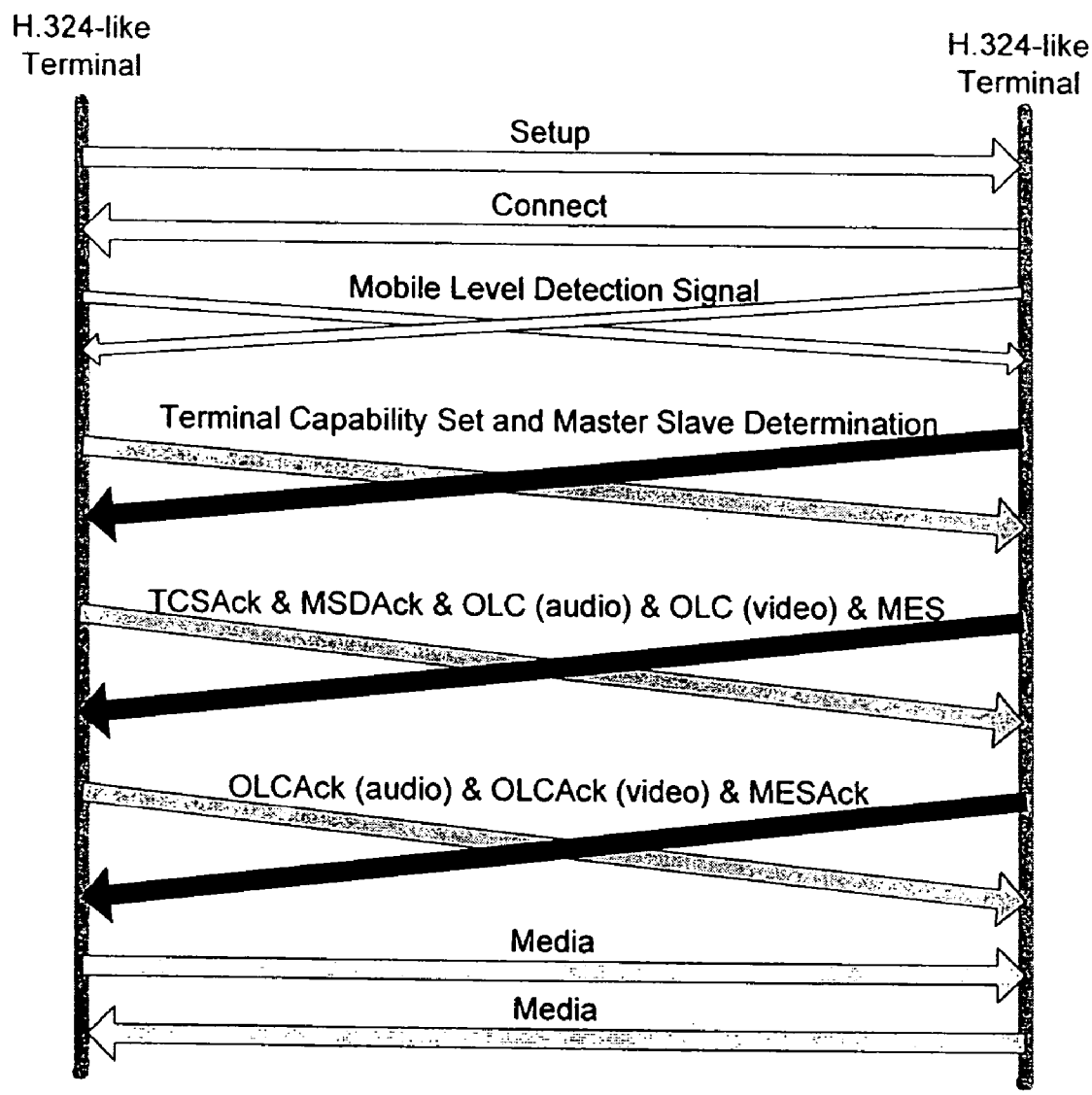
FIG. 2 illustrates an embodiment of the method of using concatenated H.245 between two H.324 terminals to reduce connection times for H.324 calls.

In a particular embodiment of this method of concatenated H.245 messages a terminal combines H.245 Request Terminal Capabilities (TCS) and Request Master Slave Determination (MSD) messages into a single H.245 PDU. It also concatenates TCS and MSD Response Messages (Acks), multiple Open Logical Channel Requests (OLC) and Multiplex Table Entry Send Request (MES) in a single H.245 PDU. Finally it combines OLC and MES responses into a third H.245 PDU. The process of setting up an H.324 call between two terminals which support this embodiment of the concatenation method is illustrated in FIG. 2. The result of adopting this approach reduces the number of round trips required for call setup from around ten to three. This embodiment requires that the MSDSE and CESE state machines can run in parallel, and that the multiple LCSE and MTSE state machines can run in parallel. This embodiment is merely one example of the application of the method of concatenated H.245 messages in the present invention; other concatenations of messages can be constructed; these may put different constraints on the signaling entity state machines within the implementation of H.245.

Optionally, the method also includes reverting to a normal operation if one of the terminals does not support Type I (i.e. concatenated H.245 messages). The calling terminal in this case detects that because it would not have received the H.245 response to the second of the concatenated H.245 messages. In this case the calling terminal would revert to individual H.245 messages in the SRP command frames and retransmit the H.245 messages individually from the second message onwards. There can be many other variations, alternatives, and modifications.

Alternatively, the method can also be applied to the Numbered Simple Retransmission Protocol (numbered version of SRP which includes a sequence number in the SRP command and SRP acknowledgement frames) and other like variations. Of course, there can be other variations, modifications, and alternatives.

TYPE II EXAMPLE EMBODIMENT

In a particular embodiment of the method of using custom H.245 messages, a non-standard Capability is used. An H.324-like equipment requires that the first H.245 message it sends is a Terminal Capability Set (TCS) message. The calling equipment includes a capability of type NonStandardParameter in the TCS it sends to the answering equipment. This capability is identified by a NonStandardIdentifier with a unique Object Identifier. This capability contains Equipment Preferences which are the additional parameters needed by the called terminal to start the call, including terminalType (needed for MSD in the same manner as it is required for standard H.245 operation) and Multiple Table Entry (MTE) Descriptors. FIG. 6 shows an example of an ASN.1 description containing the syntax for all of these data. By including this NonStandard Capability, the calling party is required to accept the decision of the called party as to whether this method is used, and what channels are selected.

If the called equipment does not support this method the calling equipment receives a conventional TCSAck and normal H.245 negotiation is then used to continue the call set-up.

If a called terminal receives a TCS containing the Non-Standard capability relating to this method and itself supports the method, it will perform a master slave determination by comparing the terminalType value in the received NonStandard capability with the value for the local terminal. The highest value will be selected as the master. In the event of equal terminal type values, the calling terminal will be selected as the master.

The called terminal will analyze the received capability table and capability descriptors to determine the OpenLogicalChannel and multiplex table entries for the new connection. The called terminal will respond with a normal TCSAck if it cannot derive an acceptable channel configuration, or if it is unable to accept the multiplexEntryDescriptors provided. The remainder of the call set-up will then be via normal H.245 negotiation.

If acceptable channel configurations and multiplex table entries can be derived, the called party will replace the normal TCSAck with an H.245 ResponseMessage of the type NonStandardMessage. See FIG. 7 for an ASN.1 Syntax description of the encoded data. The NonStandardIdentifier of the non-standard response message will have the same Object Identifier as the NonStandard capability which identifies this method.

Note that the called terminal does not include any additional or NonStandard capabilities into the TCS it sends to the calling terminal, even if it supports this method. The calling terminal must wait to receive either a TCSAck or the NonStandardMessage before proceeding.

Figure 3:
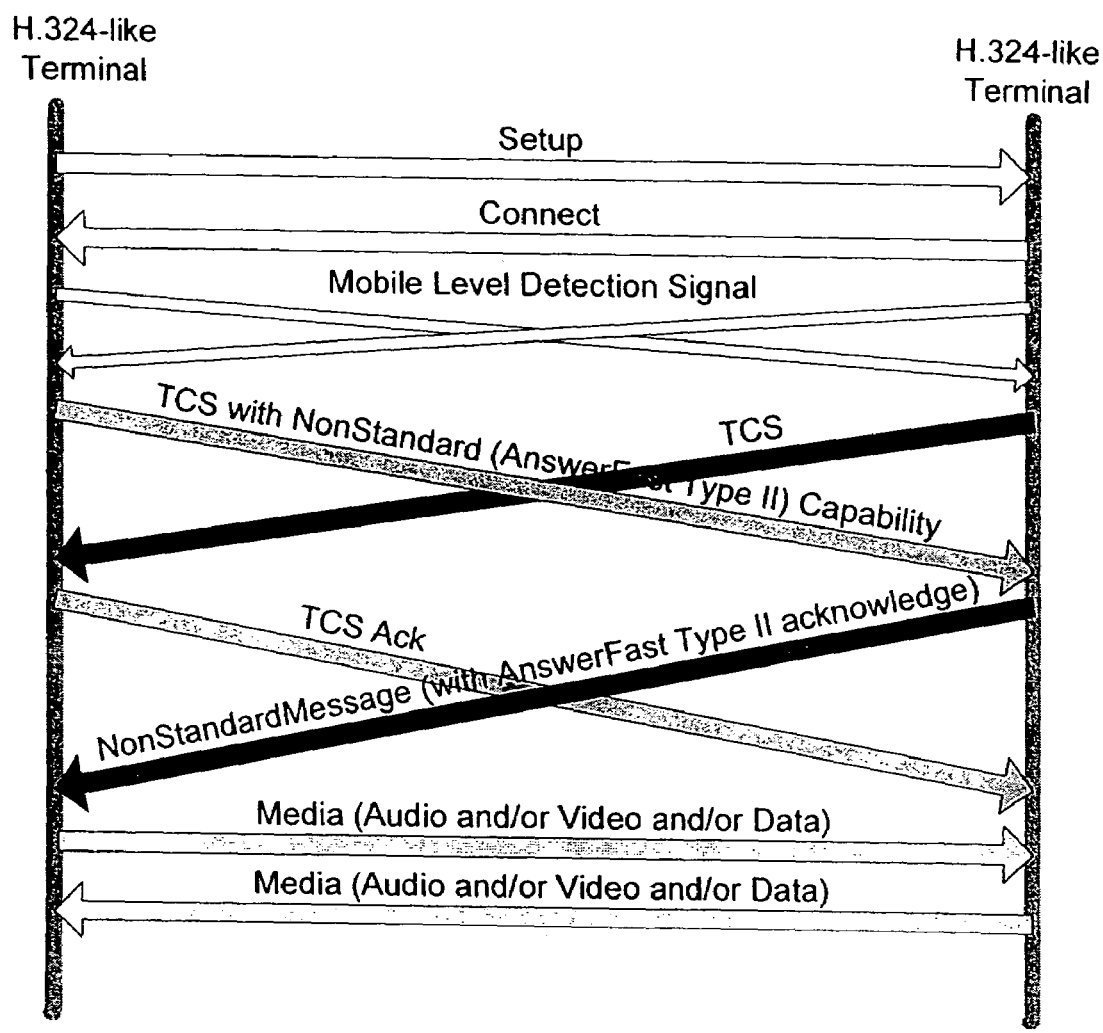
FIG. 3 illustrates an embodiment of the method of using non-standard extensions of H.245 messages to reduce connection times for H.324 calls.

The process of setting up an H.324 call between two terminals which support this embodiment of the method of using custom H.245 messages is illustrated in FIG. 3. This embodiment offers one and a half less round trip exchanges than the embodiment of the method of Concatenated H.245.

By embedding the Equipment Preferences as a NonStandard capability on the TerminalCapabilitySet request message ensures that the called terminal would not malfunction or hang-up as it is required to be able to handle the case of a non-standard Capability being communicated to it.

The second key aspect is that the encapsulation of the custom message in the TerminalCapabilitySet request message allows the terminal to transmit the custom message in the first H.245 message after the mobile level determination is done, and hence it does not have to wait.

The third aspect is that the TerminalCapabilitySet request containing the Type II message embedded as a non-standard Capability can be transmitted using the Type I mode (together with one or more H.245 messages).

The fourth aspect is that the called terminal responds with an Ack message that informs the calling terminal of the preferred modes of the called terminal and its selection of one of the preferred modes of the calling terminal if the calling terminal presented several preferences in its Type II message.

TYPE III EXAMPLE EMBODIMENT

In a particular embodiment of the method of using call signaling "user" information, Q.931 User-User Information Element is used in the SETUP and CONNECT PDUs. This Information Element is filled with an ASN.1 encoded structure (See FIG. 8) including terminalType (needed for MSD in the same manner as it is required for standard H.245 operation) and a list of profiles the calling terminal wishes to offer. By including this Information Element, the calling party is required to accept the decision of the called party as to whether this method is used, and what profile is selected.

Each profile dictates the Mobile Level, Multiplex Table Entries, Logical Channels used and codecs used for each Logical Channel. FIG. 10 illustrates some examples of profiles. The profile contains all the information required to immediately begin a call and establish media between the terminals without the need to go through further H.245 signaling after the bearer is set up.

If the called terminal does not support this method, the calling terminal receives a Q.931 CONNECT PDU without a User-User Information Element and normal call set-up is then used.

If a called terminal receives a SETUP PDU containing the User-User Information Element relating to this method and itself supports the method, it will perform a master slave determination by comparing the terminalType value in the received Information Element with the value for the local terminal. The highest value will be selected as the master. In the event of equal terminal type values, a technique such as selecting the calling terminal as the master can be used to resolve the conflict.

The called terminal will also select one of the offered profiles. If none of the offered profiles are suitable then no User-User Information Element should be added to the Q.931 CONNECT PDU, and the call proceeds as normal.

If a profile is suitable then the master slave determination result and the selected profile is encoded according to the ASN.1 Syntax for the response and added to the Q.931 CONNECT PDU as a User-User Information Element. FIG. 9 illustrates a particular embodiment.

Figure 4:
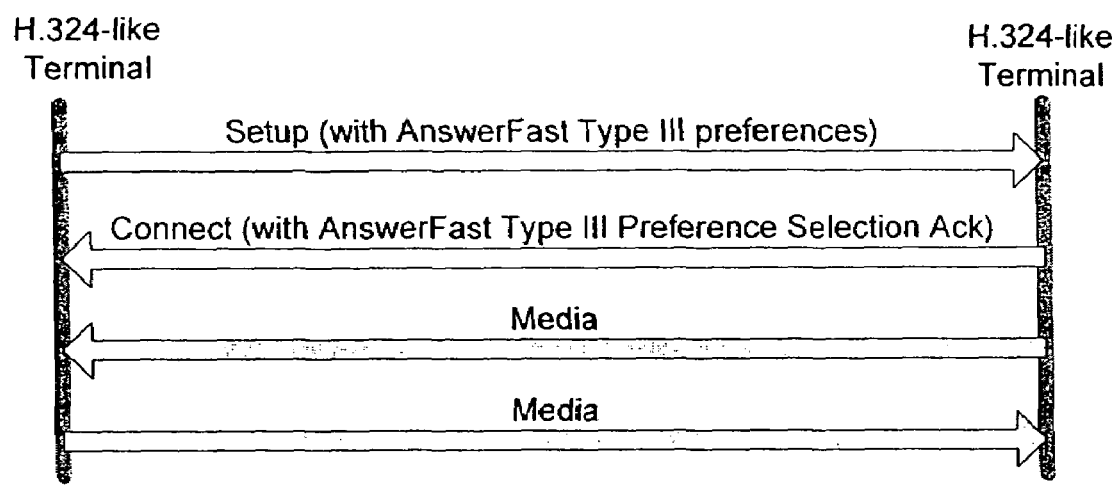
FIG. 4 illustrates an embodiment of the method of using bearer "user" information to reduce connection times for H.324 calls.

The process of setting up an H.324 call between two terminals which support this embodiment of the method of using call signaling "user" information is illustrated in FIG. 4.

TYPE IV EXAMPLE EMBODIMENT

Figure 11:
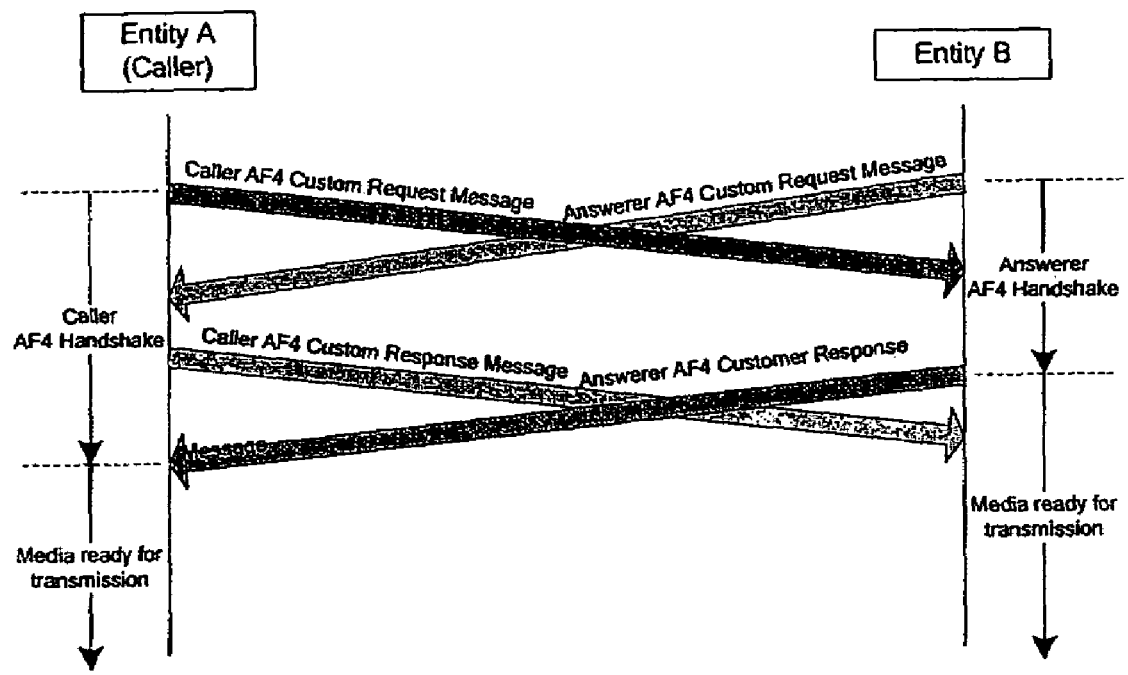
FIG. 11 illustrates an embodiment of the Type IV speed-up technique according to the present invention.

The embodiment is illustrated in FIG. 11 where the Equipment Preferred modes (Request and Response messages shown in FIG. 11) are transmitted on the bearer channel. The Equipment Preferred modes can be similar to that described in the Type III embodiment section and can be an explicit description of preferred modes or a coded (index for look-up in a table of common modes).

Note in the example embodiment shown in FIG. 4 the Answerer (Entity B) is the Decision maker which selects the preferred mode of operation from Preference Modes proposed by the Caller (Entity A) in its Request Message. The Caller Preference Modes in its Request Message could include one or more Preference Modes. The Answerer Request Message could be empty or could include dummy informational messages. The Caller Request Message could be empty or could include dummy informational messages. The Answerer Response Message carries the adopted Preference Mode (i.e. the Answerer decides which mode to proceed with).

Note the roles of the decision making can be reversed. That is, the Caller could make the decision of preference mode to be adopted from the Preferences transmitted by the Answerer in its Request Message.

Another way to select a Decision Maker is to have both terminals transmit a random number and have the terminal with highest (or lowest) number be the decision maker. In case of a tie, the scheme would assume the Caller (or Answerer) to be the Decision maker.

Many possible schemes for appointing a Decision Maker are possible. The important aspect is the "rule" for appointing a Decision maker has to be adopted and used by both Terminals. There is no real advantage in using one or the other. The one illustrated in the embodiment is the simplest. With reference to FIG. 11, the Caller AF4 Request message can be constructed according to the procedure below:

Type IV Requests and Responses Construction Procedure

Step A: Let S1=the Equipment Preferences message (explicit or coded such as an index in a table). The Equipment Preferences include information as described in the Type III technique and illustrated in FIG. 10. The message can be expressed as an encoded ASN.1 string or using another syntax.

Step B: Let S2=S1 encoded for error robustness. If no error coding is used then S2 is equal to S1.

Step C: Let S3=S2 framed with framing flag sequence for facilitating detection and synchronization. Note frame flag emulation in the S2 needs to be detected and protected. Protection can utilise a repetition mechanism. For example if the framing flag is <f1><f2>, and an <f1><f2> occurs in S2, then the <f1><f2> is replaced by <f1><f2><f1><f2> by the transmitted. The receiver will replace any received <f1><f2><f1><f2> by <f1><f2>. Note that if error encoding is used then this could be signaled by using a different set of framing flags in this procedure.

Step D: S4=S3 framed padded with framing flag sequence in order to extend the length of the string (number of octets) to a multiple of 160 octets. This optional step is practical for 3G-324M implementation as the transmission time slots typically correspond to 160 octets. If padding is not important then S4 is same as S3.

The caller and answerer terminals transmit their Request message constructed as described above one or more times (typically a minimum of 2) back to back (separated only by padding or synchronization and framing flags) in order to avoid cases where the first few octets of S4 could have been lost because of bearer setup timing.

After the caller terminal transmits its preferred modes it expects a response or a conventional H.324-like initial bearer transmission of this method of session speed-up is not supported. What the answerer first transmits on the bearer channel can be ignored by the caller and only used by the caller to notice that the called (answerer) terminal supports this method of session speed-up. The called terminal transmits its response which incorporates the accepted mode of operation as described in the Type III operation with the only difference being that the messages would be constructed according the construction procedure above with the message being the response message.

Once the caller terminal receives the response it can start transmitting its media. The called terminal will be in position to accept media when it has transmitted its response.

Note that the caller will be in a position to accept media according to its proposal when it transmits its request.

Note if the terminals do not recognize the messages or cannot detect them (e.g. because of corruption) then they can proceed according to Type II speed-up.

Figure 5:
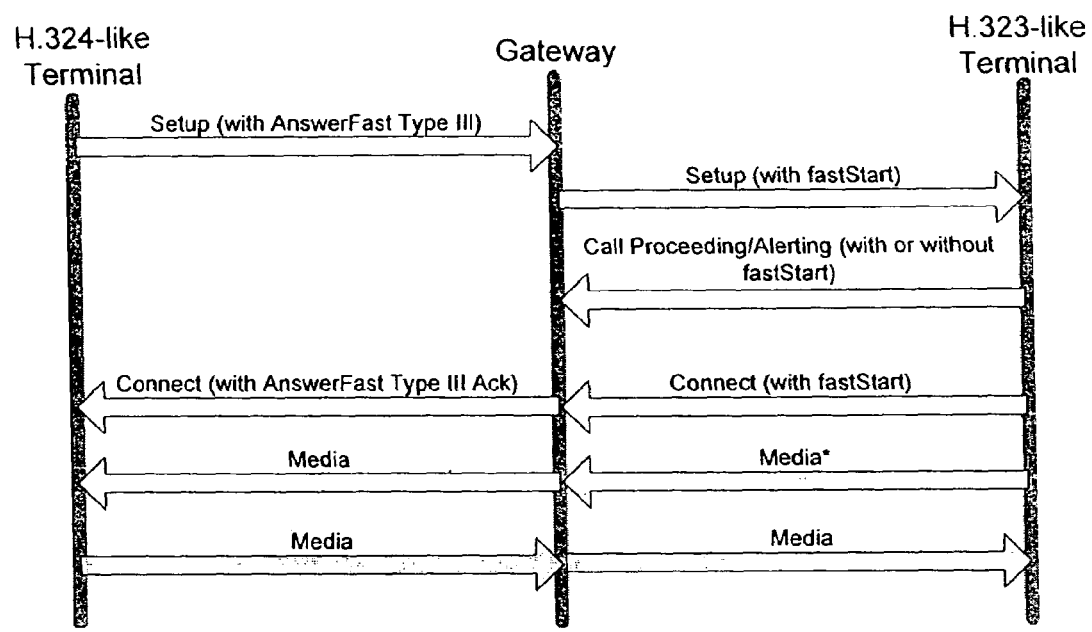
FIG. 5 illustrates an embodiment of the method of using bearer "user" information to reduce connection times for calls between an H.324 terminal and an H.323 terminal using a gateway.

Embodiment in the Context of a H.324/H.323 Gateway:

A further embodiment demonstrating use with a gateway to an H.323 terminal using "FastConnect" is illustrated by FIG. 5. These embodiments offer a maximum reduction in call set up time. These embodiments eliminate all round trip exchange for H.245 messages and, for the H.324 call segment, initial mobile level detection.

Embodiment in the Context of a H.324/SIP Gateway:

The embodiment in this context is similar to that of the H.324/H.323 gateway with the exception that the gateway converts the information (Type I, II, III and/or IV) to SIP signaling messages.

Additionally, any terminal may support Type III and another terminal may support Type I/II/IV. Both terminals should be able to operate at their common support type (i.e. in this case Type II) as if the calling terminal would not receive the Type III response in the call signaling phase. The general mode is that terminals fall back to the highest common mode and within that mode to the highest supported version. Of course, there may be variations, alternatives, and modifications.

Although each of the above techniques has been described according to specific techniques including Type I, Type II, Type III, and Type IV, there can be various modifications, alternatives, and variations. That is, one or more of the various types can be combined with other types according to a specific embodiment. Additionally, a specific sequence of methods using certain types can be performed. As merely an example, a method using Type III and then Type IV and then Type II and then Type I and then a standard mode of operation can be performed. Alternatively, any combination of these types depending upon the application can also be performed according to specific embodiments. In a specific embodiment, Type II may be performed if Type III fails or is not supported. Alternatively or in combination, Type I may be performed if Type II fails or is not supported. Any practical combination of these may be used depending upon a level of support for each of the terminals according to a specific embodiment. In general, however, techniques using the call signaling process for embedding messages for the initial mode of operation may be performed before those techniques using processes after call signaling has been established. Of course, one of ordinary skill in the art would recognize many variations, modifications, and alternatives.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein. For example, the functionality above may be combined or further separated, depending upon the embodiment. Certain features may also be added or removed. Additionally, the particular order of the features recited is not specifically required in certain embodiments, although may be important in others. The sequence of processes can be carried out in computer code and/or hardware depending upon the embodiment. Of course, one of ordinary skill in the art would recognize many other variations, modifications, and alternatives.

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of processing a call between users with reduced call set-up times using one or more telecommunication networks, the method being provided between at least a pair of H.324-like terminals coupled to the one or more telecommunication networks, the method comprising:

provliding one or more preferences for a call associated with a first terminal and a second terminal, the one or more preferences being associated with an initial mode of operation for the call between the first terminal and the second terminal;

processing the one or more preferences as a Custom Message;

establishing a bearer channel between the first terminal and the second terminal after a call signaling process;

transferring the Custom Message from the first terminal to the second terminal through a telecommunication network using the bearer channel prior to transferring an H.245 message from the first terminal to the second terminal using a control channel;

processing the Custom Message by the second terminal;

transferring a Custom Response Message by the second terminal using one or more response messages to indicate to the first terminal the initial mode of operation; and exchanging information between the first terminal and the second terminal after the initial mode of operation has been established.

2. The method of claim 1 wherein the information comprises voice and video.

3. The method of claim 1 wherein the information comprises voice.

4. The method of claim 1 wherein the information comprises data.

5. The method of claim 1 wherein the information comprises video.

6. The method of claim 1 wherein the one or more preferences is associated with an ITU-T ASN.1 custom message.

7. The method of claim 1 wherein the one or more preferences is provided in a table, the table being stored in one or more memories.

8. The method of claim 1 wherein the one or more preferences is coded as an index from a plurality of indices into a table of a plurality of predefined preferences modes, wherein the one or more preferences is retrieved from the table by at least one of the terminals.

9. The method of claim 1 wherein the first terminal is an H.324-like gateway.

10. The method of claim 1 wherein the first terminal is selected from an H.324-like handset, an H.324-like gateway, or an H.324-like server.

11. The method of claim 1 wherein the second terminal is an H.324-like gateway.

12. The method of claim 1 wherein the second terminal is selected from an H.324-like handset, an H.324-like gateway, or an H.324-like server.

13. The method of claim 1 further comprising repeating the transferring of the Custom Message from the first terminal to the second terminal and processing the Custom Message by the second terminal for at least N times, where N is 1 or greater; and repeating transferring of the Custom Response Message from the second terminal to the first terminal for at least M times, where M is equal to N.

14. The method of claim 1 wherein the Custom Response Message is an indication that at least one of the one or more preferences has been received by the second terminal.

15. The method of claim 14 wherein at least one preference is a preferred mode of operation of the second terminal.

16. The method of claim 1 further comprising repeating the transferring of the Custom Message from the first terminal to the second terminal and processing the Custom Message by the second terminal for at least N times, where N is 1 or greater, to enhance detectability of the one or more preferences by the second terminal.

17. The method of claim 1 further comprising repeating the transferring of the Custom Message from the first terminal to the second terminal before the initial mode of operation has been established and processing the Custom Message by the second terminal for at least N times, where N is 1 or greater.

18. The method of claim 1 further comprising establishing a standard mode of operation between the first terminal and the second terminal if the initial mode of operation associated with the Custom Message has not been established between the first terminal and the second terminal.

19. A computer-readable medium encoded with a computer program for processing a call between users with reduced call set-up times using one or more telecommunication networks, the computer-readable medium comprising:
one or more memories, the one or more memories comprising:
code directed to providing one or more preferences for a call associated with a first terminal and a second terminal, the one or more preferences being associated with an initial mode of operation for the call between a first terminal and a second terminal;
code directed to processing the one or more preferences as a Custom Message;
code directed to establishing a bearer channel between the first terminal and the second terminal; and
code directed to transferring the Custom Message from the first terminal to the second terminal through a telecommunication network using the bearer channel prior to transferring an H.245 message from the first terminal to the second terminal using a control channel.

20. The computer-readable medium of claim 19 wherein the one or more memories further comprise:
code directed to processing the Custom Message by the second terminal;
code directed to transferring a Custom Response Message by the second terminal using one or more response messages to indicate to the first terminal the initial mode of operation.

21. The computer-readable medium of claim 19 wherein the one or more memories further comprise:
code directed to exchanging information between the first terminal and the second terminal after the initial mode of operation has been established.

22. The computer-readable medium of claim 19 wherein the first terminal is selected from an H.324-like handset, an H.324-like gateway, or an H.324-like server.

23. The computer-readable medium of claim 19 wherein the first terminal is selected from an H.324-like handset, an H.324-like gateway, or an H.324-like server.

24. The computer-readable medium of claim 19 wherein the information comprises at least voice, data, and video.

25. A method of processing a call between users with reduced call set-up times using one or more telecommunication networks, the method being provided between at least a pair of H.324-like terminals coupled to the one or more telecommunication networks, the method comprising:
providing one or more preferences for a call associated with a first terminal and a second terminal, the one or more preferences being associated with an initial mode of operation for the call between the first terminal and the second terminal;
processing the one or more preferences as a Custom Message;
establishing a bearer channel between the first terminal and the second terminal;
transferring the Custom Message using one or more messages from the first terminal to the second terminal through a telecommunication network using the bearer channel prior to transferring an H.245 message from the first terminal to the second terminal using a control channel;
processing the Custom Message by the second terminal;
accepting at least one preference in the Custom Message by the second terminal;
transferring a Custom Response Message by the second terminal using one or more response messages to indicate to the first terminal that the initial mode of operation including the at least one preference has been accepted; and
exchanging information between the first terminal and the second terminal after the initial mode of operation has been established.

26. A method of processing a call between users with reduced call set-up times using one or more telecommunication networks, the method being provided between at least a pair of H.324-like terminals coupled to the one or more telecommunication networks, the method comprising:
providing one or more preferences for a call associated with a first terminal and a second terminal, the one or more preferences being associated with an initial mode of operation for the call between the first terminal and the second terminal;

processing the one or more preferences as a first Custom Message;
processing the one or more preferences as a second Custom Message;
establishing a bearer channel between the first terminal and the second terminal after a call signaling process;
determining whether the first terminal or the second terminal becomes a decision making terminal for selecting at least one preferred mode to be used by the first terminal and the second terminal;
identifying either the first terminal or the second terminal as the decision making terminal while the other terminal becomes an accepting terminal;
transferring the first Custom Message from the decision making terminal to the accepting terminal through a telecommunication network using the bearer channel prior to transferring an H.245 message from the first terminal to the second terminal using a control channel;
processing the first Custom Message by the accepting terminal;
transferring the second Custom Message from the accepting terminal to the decision making terminal through the telecommunication network using the bearer channel;
accepting at least one preference in the second Custom Message by the accepting terminal; and
exchanging information between the decision making terminal and the accepting terminal after the initial mode of operation has been established.

27. The method of claim 26 wherein the determining of the decision making terminal is provided by a pre-established process.

28. The method of claim 27 wherein the pre-established process selects either the first terminal or the second terminal as the decision making terminal.

29. The method of claim 26 wherein the determining of the decision making terminal is provided by information in at least one of the first Custom Message and the second Custom Message.

30. The method of claim 29 further comprising determining if a conflict exists in whether the first terminal or the second terminal is the decision making terminal and then determining the decision making terminal by a pre-established process.

31. A method of processing a call between users with reduced call set-up times using one or more telecommunication networks, the method being provided between at least a pair of H.324-like terminals coupled to the one or more telecommunication networks, the method comprising:
providing one or more first preferences associated with a first preference mode for a call associated with a first terminal and a second terminal, the one or more first preferences being associated with an initial mode of operation for the call between the first terminal and the second terminal;
processing the one or more preferences as a first Custom Message;
embedding the first Custom Message in a predetermined field of one or more messages of a call signaling message;
establishing a bearer channel between the first terminal and the second terminal;
transferring the first Custom Message from the first terminal to the second terminal through a telecommunication network during a call signaling phase prior to transferring an H.245 message from the first terminal to the second terminal using a control channel;
processing the first Custom Message by the second terminal;
determining if the first Custom Message associated with the first preference mode is supported by the second terminal; and
transferring a first Custom Response Message by the second terminal using a call signaling response message to the first terminal to indicate if the first preference mode has been accepted by the second terminal.

32. The method of claim 31 further comprising performing a second process for call set up if the first preference mode is not recognized or is not supported or has not been accepted by the second terminal, the second process comprising:
processing one or more second preferences associated with a second preference mode as a second Custom Message;
transferring the second Custom Message from the first terminal to the second terminal through a telecommunication network using the bearer channel;
processing the second Custom Message by the second terminal;
transferring a second Custom Response Message by the second terminal using one or more second response messages to the first terminal to indicate if the second preference mode has been supported by the second terminal.

33. The method of claim 32 further comprising performing a third process for call set up if the second preference mode has not been supported by the second terminal, the third process comprising:
processing one or more custom Non-Standard H.245 messages or custom Non Standard fields in standard messages, the one or more custom Non-Standard H.245 messages or custom Non-Standard fields in standard messages being associated with a third initial predetermined mode of operation;
transferring the one or more custom Non-Standard H.245 messages or custom Non Standard fields in standard messages through a telecommunication network using the bearer channel from the first terminal to the second terminal;
processing the one or more custom Non-Standard H.245 messages or custom Non Standard fields in standard messages by the second terminal;
transferring a Custom Non-Standard response message associated with the one or more custom Non-Standard H.245 messages or custom Non-Standard fields in standard messages from the second terminal to the first terminal to indicate if the third initial predetermined mode of operation has been supported by the second terminal.

34. The method of claim 33 further comprising performing a fourth process for call set up if the third initial predetermined mode of operation has not been supported by the second terminal, the fourth process comprising:
determining a common mobile level;
determining two or more H.245 messages associated with a set-up parameters for an initial fourth predetermined mode of operation;
concatenating the two or more H.245 messages into at least one SRP frame, the one SRP frame being characterized by a predetermined size of the SRP command frame;
transmitting the SRP command frame, including the two H.245 messages, from the first terminal to the second terminal through a telecommunication network; and transmitting an SRP acknowledge message from the second terminal to the first terminal indicate if the initial fourth predetermined mode of operation has been supported by the second terminal.

35. The method of claim 34 further comprising operating the first terminal and the second terminal in a standard mode of operation if the initial fourth predetermined mode of operation has not been supported by the second terminal.

36. A method of processing a call between users with reduced call set-up times using one or more telecommunication networks, the method being provided between at least a pair of H.324-like terminals coupled to the one or more telecommunication networks, the method comprising:
   providing one or more preferences for a call associated with a first terminal and a second terminal, the one or more preferences being associated with an initial mode of operation for the call between the first terminal and the second terminal;
   processing the one or more preferences as a Custom Message;
   establishing a bearer channel between the first terminal and the second terminal after a call signaling process;
   transferring the Custom Message from the first terminal to the second terminal through a telecommunication network using the bearer channel prior to transferring an H.245 message from the first terminal to the second terminal using a control channel;
   processing the Custom Message by the second terminal; and
   exchanging information between the first terminal and the second terminal after the initial mode of operation has been established.

37. A method of initiating a set up process for a call between users with reduced set-up times using one or more 3G telecommunication networks, the method being provided between at least a pair of H.324-like terminals coupled to the one or more 3G telecommunication networks, the method comprising:
   providing one or more preferences for a call between a first terminal and a second terminal, the one or more preferences being associated with one or more modes of operation for the call between the first terminal and the second terminal;
   processing the one or more preferences as a message;
   establishing a bearer channel between the first terminal and the second terminal after a call signaling process; and
   transferring the message from the first terminal to the second terminal through a portion of a telecommunication network using the bearer channel prior to transferring an H.245 message from the first terminal to the second terminal using a control channel, the portion of the telecommunication network being capable of transmitting at least voice, video, and data.

38. The method of claim 37 wherein the one or more modes of operation is predetermined.

39. The method of claim 37 wherein the one or more modes of operation is determined.

40. The method of claim 37 wherein the one or more modes of operation is predefined.

41. The method of claim 37 wherein the one or more modes of operation is explicit.

42. The method of claim 37 wherein the one or more messages is one or more Custom messages.

43. The method of claim 37 wherein the one or more messages is one or more non-standard messages.

44. The method of claim 37 wherein the one or more 3G networks is a 3GPP network.

45. The method of claim 37 wherein the one or more 3G networks is a 3GPP2 network.

46. The method of claim 37 further comprising processing the one or more messages by the second terminal; and
   transferring one or more response messages by the second terminal using one or more response messages to indicate to the first terminal the one or more modes of operation.

47. The method of claim 46 further comprising exchanging information between the first terminal and the second terminal after an initial mode of operation has been established.

48. A computer-readable medium encoded with a computer program for processing a call between users with reduced call set-up times using one or more telecommunication networks, the computer-readable medium comprising:
   one or more memories, the one or more memories comprising:
   code directed to providing one or more preferences for a call associated with a first terminal and a second terminal, the one or more preferences being associated with a mode of operation for the call between a first terminal and a second terminal;
   code directed to processing the one or more preferences as a Custom Message;
   code directed to establishing a bearer channel between the first terminal and the second terminal; and
   code directed to transferring the Custom Message from the first terminal to the second terminal through a telecommunication network using the bearer channel prior to transferring an H.245 message from the first terminal to the second terminal using a control channel.

49. The computer-readable medium of claim 48 wherein the one or more memories further comprises:
   code directed to processing the Custom Message by the second terminal; and
   code directed to transferring a Custom Response Message by the second terminal using one or more response messages to indicate to the first terminal the predetermined mode of operation.

50. The computer-readable medium of claim 48 wherein the one or more memories further comprises:
   code directed to exchanging information between the first terminal and the second terminal after the initial mode of operation has been established.

51. A method of processing a call between users with reduced call set-up times using one or more mobile telecommunication networks, the method being provided between at least a pair of H.324-like terminals coupled to the one or more mobile telecommunication networks, the method comprising:
   providing one or more preferences for a call associated with a first terminal and a second terminal, the one or more preferences being associated with a mode of operation for the call between the first terminal and the second terminal;
   processing the one or more preferences as a message;
   establishing a bearer channel between the first terminal and the second terminal after a call signaling process; and
   transferring the message from the first terminal to the second terminal through a telecommunication network using the bearer channel prior to transferring an H.245 message from the first terminal to the second terminal using a control channel.

52. The method of claim 51 wherein the message is a Custom Message.

53. The method of claim 52 further comprising:
processing the Custom Message by the second terminal; and
exchanging information between the first terminal and the second terminal after the initial mode of operation has been established.

54. A method of processing a call between users with reduced call set-up times using one or more telecommunication networks, the method being provided between at least a pair of H.324-like terminals coupled to the one or more telecommunication networks, the one or more telecommunication networks being capable of transferring at least voice, video, and data, the method comprising:
providing one or more preferences for a call associated with a first 3G terminal and a second 3G terminal, the one or more preferences being associated with a predetermined mode of operation for the call between the first 3G terminal and the second 3G terminal;
processing the one or more preferences as a Custom Message;
establishing a circuit-switched bearer channel between the first 3G terminal and the second 3G terminal after a call signaling process; and
transferring the Custom Message from the first 3G terminal to the second 3G terminal through a 3G telecommunication network using the circuit-switched bearer channel prior to transferring an H.245 message from the first 3G terminal to the second 3G terminal using a control channel.

55. A mobile communication terminal capable of transferring at least voice, video, and data and processing a call between users with reduced call set-up times using one or more telecommunication networks, the mobile communication terminal comprising a computer readable medium encoded with a computer program, the computer-readable medium including one or more computer memories, the one or more computer memories including:
one or more codes directed to providing one or more preferences for a call between the mobile communication terminal and another terminal, the one or more preferences being associated with one or more modes of operation for the call;
one or more codes directed to processing the one or more preferences to provide at least one message;
one or more codes directed to establishing a bearer channel between the mobile communication terminal and the other terminal after a call signaling process; and
one or more codes directed to transferring the at least one message from the mobile communication terminal to the other terminal through at least a portion of a telecommunication network using the bearer channel prior to transferring an H.245 message from the first terminal to the second terminal using a control channel, the portion of the telecommunication network being capable of transmitting at least data.

56. The terminal of claim 55 wherein the terminal is a mobile handset.

57. The terminal of claim 55 wherein the terminal is a gateway coupled to the 3G telecommunication network.

58. The terminal of claim 55 wherein the one or more modes of operation is related to one or more predetermined modes of operation.

59. The terminal of claim 55 wherein the terminal is terminal equipment.

60. The terminal of claim 55 wherein the telecommunication network is capable of transmitting voice and video.

61. The computer-readable medium of claim 48 wherein the one or more telecommunications networks comprise at least one of a 3GPP or 3GPP2 network.

62. The computer-readable medium of claim 48 wherein at least one of the first terminal or the second terminal is an H.324-like terminal.

63. The computer-readable medium of claim 62 wherein the H.234-like terminal comprises at least one of an H.324-like gateway, an H.324-like handset, or an H.324-like server.

64. The method of claim 51 wherein at least one of the first terminal or the second terminal is an H.324-like terminal.

65. The method of claim 64 wherein transferring the message from the first terminal to the second terminal through a telecommunication network using the bearer channel is performed prior to transferring a first mobile level flag from the first terminal to the second terminal.

66. The method of claim 64 wherein the H.234-like terminal comprises at least one of an H.324-like gateway, an H.324-like handset, or an H.324-like server.

67. The method of claim 64 wherein the H.324-like terminal comprises a 3G-324M terminal.

68. The method of claim 51 wherein the preferences are predefined, predetermined, or explicit.

69. The method of claim 68 wherein the predetermined preferences are provided as an index into a set.

70. The method of claim 51 wherein the one or more mobile telecommunications networks comprise at least one of a 3GPP or 3GPP2 network.

71. The method of claim 53 wherein at least one of the first terminal or the second terminal is an H.324-like terminal and the information comprises voice and video.

72. The method of claim 71 wherein the information comprises voice, video, and data.

73. The method of claim 19 wherein transferring the Custom Message from the first terminal to the second terminal through a telecommunication network using the bearer channel is performed prior to transferring a first mobile level flag from the first terminal to the second terminal.

74. The method of claim 36 wherein transferring the Custom Message from the first terminal to the second terminal through a telecommunication network using the bearer channel is performed prior to transferring a first mobile level flag from the first terminal to the second terminal.

75. A method of processing a call between users with reduced call set-up times using one or more mobile telecommunication networks, the method being provided between at least a pair of H.324-like terminals coupled to the one or more mobile telecommunication networks, the method comprising:
providing one or more preferences for a call associated with a first H.324-like terminal and a second H.324-like terminal, the one or more preferences being associated with a mode of operation for the call between the first H.324-like terminal and the second H.324-like terminal;
processing the one or more preferences as a Custom Message, wherein a format of the Custom Message provides protection against frame flag emulation;

establishing a circuit-switched bearer channel between the first H.324-like terminal and the second H.324-like terminal after a call signaling process;

transferring the Custom Message from the first H.324-like terminal to the second H.324-like terminal through at least a 3GPP or a 3GPP2 telecommunication network using the circuit-switched bearer channel prior to transferring an H.245 message from the first H.324-like terminal to the second H.324-like terminal using a control channel;

establishing the mode of operation for the call between the first H.324-like terminal and the second H.324-like terminal based, in part, on the Custom Message; and exchanging at least voice and video information between the first H.324-like terminal and the second H.324-like terminal after the mode of operation has been established.

76. The method of claim 75 wherein at least one of the first H.324-like terminal or the second H.324-like terminal comprises an H.324-like gateway, an H.324-like handset, or an H.324-like server.

77. The method of claim 75 wherein the first H.324-like terminal comprises an H.324-like handset and the second H.324-like terminal comprises at least one of an H.324-like gateway or an H.324-like server.

78. The method of claim 75 wherein preferences are associated with one or more media channels or mobile levels for operation.

79. The method of claim 75 wherein the call signaling process comprises a Q.931 call signaling process.

80. The method of claim 75 wherein the control channel comprises logical channel zero.

81. The method of claim 75 wherein exchanging at least voice and video information further comprises exchanging at least voice, video, and data information.

82. The method of claim 75 wherein exchanging at least voice and video information is based, in part, on at least one of the Custom Message or the mode of operation for the call.

83. The method of claim 1 wherein transferring the Custom Message from the first terminal to the second terminal through a telecommunication network using the bearer channel is performed prior to transferring a first mobile level flag from the first terminal to the second terminal.

* * * * *